(12) United States Patent
Galley et al.

(10) Patent No.: US 9,967,211 B2
(45) Date of Patent: *May 8, 2018

(54) METRIC FOR AUTOMATIC ASSESSMENT OF CONVERSATIONAL RESPONSES

(71) Applicant: MICROSOFT TECHNOLOGY LICENSING, LLC, Redmond, WA (US)

(72) Inventors: Michel Galley, Seattle, WA (US); Alessandro Sordoni, Montreal (CA); Christopher John Brockett, Bellevue, WA (US); Jianfeng Gao, Woodinville, WA (US); William Brennan Dolan, Kirkland, WA (US); Yangfeng Ji, Atlanta, GA (US); Michael Auli, Menlo Park, CA (US); Margaret Ann Mitchell, Seattle, WA (US); Christopher Brian Quirk, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

This patent is subject to a terminal disclaimer.

(21) Appl. No.: 14/726,569

(22) Filed: May 31, 2015

(65) Prior Publication Data

US 2016/0352657 A1 Dec. 1, 2016

(51) Int. Cl.
*G06F 15/16* (2006.01)
*H04L 12/58* (2006.01)
*G06F 17/28* (2006.01)

(52) U.S. Cl.
CPC .......... *H04L 51/02* (2013.01); *G06F 17/2881* (2013.01); *H04L 51/10* (2013.01); *H04L 51/26* (2013.01)

(58) Field of Classification Search
CPC .......... H04L 51/02; H04L 51/26; H03L 51/10
(Continued)

(56) References Cited

U.S. PATENT DOCUMENTS 7,729,524 B2 6/2010 Rogers et al.
7,783,486 B2 8/2010 Rosser et al.
(Continued)

OTHER PUBLICATIONS

Lin, et al., "Methods for Automatically Evaluating Answers to Complex Questions", In Journal of Information Retrieval, vol. 9, Issue 5, Sep. 1, 2006, pp. 1-22.
(Continued)

*Primary Examiner* — El Hadji Sall

(57) ABSTRACT

Examples are generally directed towards automatic assessment of machine generated conversational responses. Context-message-response n-tuples are extracted from at least one source of conversational data to generate a set of multi-reference responses. A response in the set of multi-reference responses includes it context-message data pair and rating. The rating indicates a quality of the response relative to the context-message data pair. A response assessment engine generates a metric score for a machine-generated response based on an assessment metric and the set of multi-reference responses. The metric score indicates a quality of the machine-generated conversational response relative to a user-generated message and a context of the user-generated message. A response generation system of a computing device, such as a digital assistant, is optimized and adjusted based on the metric score to improve the accuracy, quality, and relevance of responses output to the user.

20 Claims, 16 Drawing Sheets

(58) Field of Classification Search
USPC .................................. 709/206, 224, 217, 203
See application file for complete search history.

(56) References Cited

U.S. PATENT DOCUMENTS

| | | | |
|---|---|---|---|
| 8,234,184 B2 | 7/2012 | Libman | |
| 8,543,454 B2 | 9/2013 | Fleischman et al. | |
| 8,725,773 B2 | 5/2014 | Pettit | |
| 2010/0120010 A1 | 5/2010 | Cohen et al. | |
| 2010/0174813 A1* | 7/2010 | Hildreth ............ | G06F 17/30943 709/224 |
| 2012/0310652 A1 | 12/2012 | O'Sullivan | |
| 2014/0122407 A1* | 5/2014 | Duan ...................... | G06N 5/02 706/50 |
| 2014/0295400 A1 | 10/2014 | Zapata-Rivera et al. | |

OTHER PUBLICATIONS

Foster, Mary Ellen, "Automated Metrics that Agree with Human Judgements on Generated Output for an Embodied Conversational Agent", In Proceedings of Fifth International Natural Language Generation Conference, Jun. 12, 2008, pp. 95-103.
Zhou, et al., "Responsive Information Architect: Enabling Context-Sensitive Information Seeking", In Proceedings of Twenty-First National Conference on Artificial Intelligence, Jul. 16, 2006, pp. 1691-1694.
Goh, et al., "A Black-box Approach for Response Quality Evaluation of Conversational Agent Systems", In International Journal of Computer, Information, Systems and Control Engineering, vol. 4, No. 6, Jan. 21, 2015, pp. 26-34.
Aggarwal, et al., "Principles for using Machine Learning in the Assessment of Open Response Items: Programming Assessment as a Case Study", In Proceedings of Neural Information Processing System Workshop on Data Driven Education, Dec. 10, 2013, pp. 1-6.
Sing, et al., "Response Quality Evaluation in Heterogeneous Question Answering System: A Black-box Approach", In International Journal of Computer, Information, Systems and Control Engineering, vol. 4, No. 5, Jan. 21, 2015, pp. 11-16.
Ritter, et al., "Data-Driven Response Generation in Social Media", In Proceedings of the Conference on Empirical Methods in Natural Language Processing, Jul. 27, 2011, 11 pages.
Papineni, et al., "BLEU: A Method for Automatic Evaluation of Machine Translation", In Proceedings of the 40th Annual Meeting of the Association for Computational Linguistics, Jul. 2002, 8 pages.
Denkowski, et al., "Meteor Universal: Language Specific Translation Evaluation for Any Target Language", In Proceedings of the Ninth Workshop on Statistical Machine Translation, Jun. 2014, 5 pages.
Snover, et al., "A Study of Translation Edit Rate with Targeted Human Annotation", In Proceedings of Association for Machine Translation in the Americas, Aug. 8, 2006, 9 pages.
Sun, et al., "Joint Learning of a Dual SMT System for Paraphrase Generation", In Proceedings of the 50th Annual Meeting of the Association for Computational Linguistics, Jul. 8, 2012, pp. 38-42.
Och, Franz Josef, "Minimum Error Rate Training in Statistical Machine Translation", In Proceedings of the 41st Annual Meeting on Association for Computational Linguistics—vol. 1, Jul. 2003, 8 pages.
Auli, et al., "Joint Language and Translation Modeling with Recurrent Neural Networks", In Proceedings of Conference on Empirical Methods in Natural Language Processing, Oct. 18, 2013, pp. 1044-1054.
Banerjee, et al., "METEOR: An Automatic Metric for MT Evaluation with Improved Correlation with Human Judgments", In Proceedings of the ACL Workshop on Intrinsic and Extrinsic Evaluation Measures for Machine Translation and/or Summarization, Jun. 2005, 8 pages.

Bengio, et al., "A Neural Probabilistic Language Model", In Journal of Machine Learning Research 3, Feb. 2003, 19 pages.
Cho, et al., "Learning Phrase Representations using RNN Encoder-Decoder for Statistical Machine Translation", In Conference on Empirical Methods in Natural Language Processing, Oct. 25, 2014, 15 pages.
Collobert, et al., "A Unified Architecture for Natural Language Processing: Deep Neural Networks with Multitask Learning", In Proceedings of the 25th International Conference on Machine Learning, Jul. 5, 2008, pp. 160-167.
Devlin, et al., "Fast and Robust Neural Network Joint Models for Statistical Machine Translation", In Proceedings of the 52nd Annual Meeting of the Association for Computational Linguistics, Jun. 23, 2014, pp. 1370-1380.
Duchi, et al., "Adaptive Subgradient Methods for Online Learning and Stochastic Optimization", In Journal of Machine Learning Research, vol. 12, Jul. 2011, pp. 2121-2159.
Gao, et al., "Learning Continuous Phrase Representations for Translation Modeling", In Proceedings of Association for Computational Linguistics, Jun. 2014, 11 pages.
Georgila, et al., "User Simulation for Spoken Dialogue Systems: Learning and Evaluation", In Proceedings of Ninth International Conference on Spoken Language Processing, Sep. 17, 2006, 4 pages.
Gutmann, et al., "Noise-Contrastive Estimation: a New Estimation Principle for Unnormalized Statistical Models", In Proceedings of 13th International Conference on Artificial Intelligence and Statistics, May 13, 2010, 8 pages.
Huang, et al., "Learning Deep Structured Semantic Models for Web Search Using Clickthrough Data", In Proceedings of the 22nd ACM International Conference on Conference on Information & Knowledge Management, Oct. 27, 2013, pp. 2333-2338.
Kalchbrenner, et al., "Recurrent Continuous Translation Models", In Proceedings of Conference on Empirical Methods in Natural Language Processing, Oct. 18, 2013, 10 pages.
Kneser, et al., "Improved Backing-off for M-gram Language Modeling", In Proceedings of International Conference on Acoustics, Speech, and Signal Processing, vol. 1, May 9, 1995, pp. 181-184.
Koehn, et al., "Moses: Open Source Toolkit for Statistical Machine Translation", In Proceedings of the 45th Annual Meeting of the ACL on Interactive Poster and Demonstration Sessions, Jun. 2007, pp. 177-180.
Mikolov, et al., "Recurrent Neural Network Based Language Model", In Proceedings of Annual Conference of the International Speech Communication Association, Sep. 26, 2010, pp. 1045-1048.
Och, et al., "The Alignment Template Approach to Statistical Machine Translation", In Journal Computational Linguistics, vol. 30, Issue 4, Dec. 2004, pp. 417-449.
Pascanu, et al., "On the Difficulty of Training Recurrent Neural Networks", In Proceedings of the 30th International Conference on Machine Learning, Jun. 16, 2013, 9 pages.
Robertson, et al., "Okapi at TREC-3", In Proceedings of 3rd Text Retrieval Conference, Jan. 31, 2015, 18 pages.
Rumelhart, et al., "Learning Representations by Back-Propagating Errors", In Neurocomputing: Foundations of Research, Jan. 1, 1988, pp. 318-362.
Stent, et al., "Natural Language Generation in Interactive Systems", In Publication of Cambridge University Press, Jun. 12, 2014, 2 pages.
Sutskever, et al., "Sequence to Sequence Learning with Neural Networks", In Proceedings of Neural Information Processing System, Dec. 8, 2014, pp. 1-9.
Young, et al., "The Hidden Information State Model: A Practical Framework for POMDP-based Spoken Dialogue Management", In Journal of Computer Speech and Language, vol. 24, Issue 2, Apr. 1, 2010, pp. 150-174.
Young, Steve, "Talking to Machines (Statistically Speaking)", In Proceedings of International Conference on Spoken Language Processing, Sep. 16, 2002, 8 pages.
Hopkins, et al, "Tuning as Ranking", In Proceedings of the 2011 Conference on Empirical Methods in Natural Language Processing, Edinburgh, Scotland, UK, Jul. 27-31, 2011, 11 pages.

(56) References Cited

OTHER PUBLICATIONS

Och, et al, "Discriminative Training and Maximum Entropy Models for Statistical Machine Translation", In Proceedings the 40th Annual Meeting of the Association from Computational Linguistics, Jul. 2002, 8 pages.

Chiang et al., "Online Large-Margin Training of Syntactic and Structural Translation Features", In Proceedings of the Conference on Empirical Methods in Natural Language Processing, Oct. 2008, 10 pages.

"NAACL HLT 2015 (@naacl2015) on Twitter", Retrieved From <<URL:https://twitter.com/naacl2015>>, Retrieved Date: Aug. 16, 2016, 1 Page.

"NAACL HLT 2015: Welcome", Retrieved From <<https://web.archive.org/web/20150708235753/http://naacl.org/naacl-hlt-2015/index.html>>, Retrieved Date: Aug. 16, 2016, 2 Pages.

"Proceedings available.naacl-org/naacl-hlt-2015@09bb5de . GitHub", Retrieved From <<https://github.com/naacl-org/naacl-hlt-2015/commit/09bb5dee>>, Retrieved Date: Aug. 16, 2016, 1 page.

Sordoni, et al., "A Neural Network Approach to Context-Sensitive Generation of Conversational Responses", In Proceedings of the Annual Conference of the North American Chapter of the Association for Computational Linguistics: Human Language Technologies, May 28, 2015, pp. 196-205.

"International Search Report and Written Opinion Issued in PCT Application No. PCT/US2016/031081", dated Aug. 25, 2016, 12 Pages.

\* cited by examiner

FIG. 3

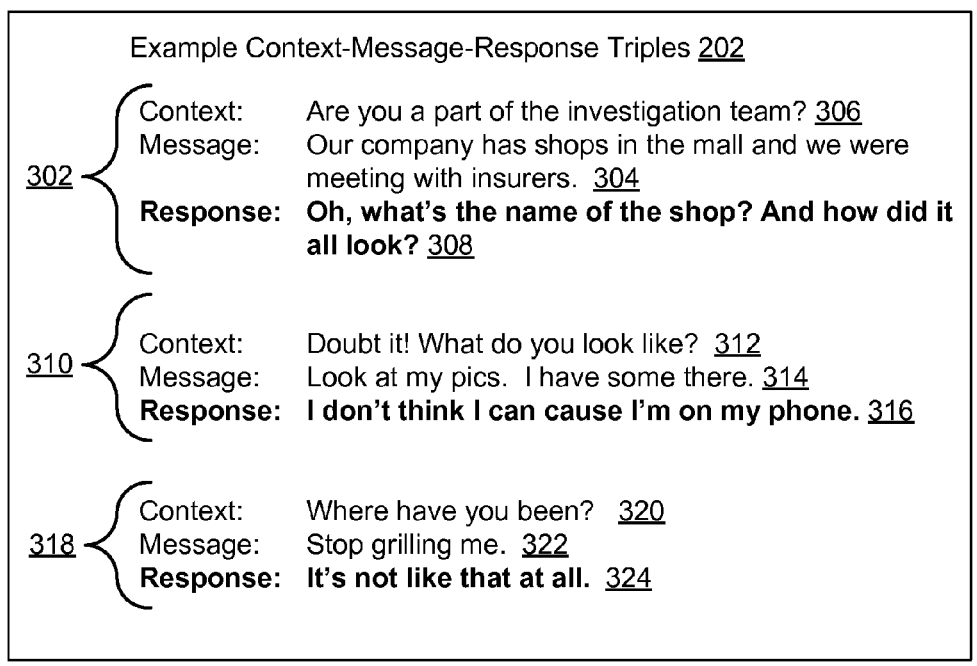

Example Context-Message-Response Triples 202

302
- Context: Are you a part of the investigation team? 306
- Message: Our company has shops in the mall and we were meeting with insurers. 304
- Response: Oh, what's the name of the shop? And how did it all look? 308

310
- Context: Doubt it! What do you look like? 312
- Message: Look at my pics. I have some there. 314
- Response: I don't think I can cause I'm on my phone. 316

318
- Context: Where have you been? 320
- Message: Stop grilling me. 322
- Response: It's not like that at all. 324

FIG. 4

Message 400:
Can you help me do my math homework?

Responses 402:
do you need help with your math homework.
I need help with the math homework?!
I'm sure with what I had math homework
you sure with what I had math homework.
of course! I had math homework.
not sure with what I had math homework.
do you need help with your math homework?
do you need help with your math homework!
I sure with what I had math homework.
sure with what I had math homework?!

FIG. 5

Message 500:
Can you help me do my math homework?

Responses 502:
yeah sure, what kind of math homework.
sure, what do your worksheet
yeah, sure do your worksheet
yeah, sure, what kind of math questions
sure with what do your worksheet
yeah sure, what kind of math worksheet
sure do your worksheet
sure! what do your worksheet
sure what do do your worksheet
need help with your homework worksheet

FIG. 6

```
IR-Based Multiple-Reference Sets

602  Context:  Doubt it! what do you look like?

604  Message:  Look at my pics I have some there

⎧  I don't think I can cause I'm on
              ⎪  my phone [Original response]
              ⎪
              ⎪  I'm just on my phone
              ⎪
              ⎪  No. Prob cause I'm on the phone.
              ⎪
              ⎪  I can't see cz I'm on my phone! Do you have
              ⎪  instagram?
              ⎪
              ⎪  maybe later haha, coz I'm just using my phone
              ⎪  now
              ⎪
              ⎪  yeah, cause I'm soo obsessed with you
  606 Responses: ⎨
              ⎪  I think I do too hehe
              ⎪
              ⎪  Doubt it! what do you look like?
              ⎪
              ⎪  Oohh that'll be why I can't see it on my phone!
              ⎪  xd okay never mind!
              ⎪
              ⎪  Ahh, am on my phone atm :\/
              ⎪
              ⎪  Sorry but I'm on my ipod n I cant do that on
              ⎪  here
              ⎪
              ⎪  ... ...
              ⎪
              ⎪  I'm on my phone ... I don't know how to find
              ⎩  pictures. Do you have a pic?
```

FIG. 7

702 { Context:   Haha I could sing for ya
      Message:   Haha I need a pain pill for the massive sun burn I have my back!!
      Response:  I have the pain pills and aloe on your back!! Haha 704 { Context:   Haha aw kez, making me blush!
      Message:   Haha! If ever I need some quotes or anything, I'll know who to call
      Response:  I got you, you can trust me! Haha 706 { Context:   I'm saying. smh
      Message:   Are you going to that fireworks thing later today?
      Response:  I'm looking forward to it! not sure yet.

708 { Context:   Yea time flies those were good times tho! You had so much class xd
      Message:   Haha I'm better now okk
      Response:  That's good to hear!

710 { Context:   No one ever gets close enough to one to actually see their face!
      Message:   Did you take a pic
      Response:  Yes I did!

712 { Context:   Probably not my brother wants me to, won't be up in time though haha
      Message:   Oh okay. I've had to set my alarm for 8:45
      Response:  I have to set mine at 8 haha

FIG. 12

| Corpus | # Triples | Avg # Ref | [Min,Max] # Ref |
|---|---|---|---|
| Tuning | 2118 | 3.22 | [1, 10] |
| Test | 2114 | 3.58 | [1, 10] |

METRIC FOR AUTOMATIC ASSESSMENT OF CONVERSATIONAL RESPONSES

BACKGROUND

Response generation systems, also known as dialog systems or conversational agents, are becoming increasingly common in a variety of systems and devices. Response generation systems include applications and computer systems designed to interpret natural language input messages and output natural language responses. However, these systems frequently output low quality responses that are not actually relevant or appropriate to the conversation.

Although some machine translation evaluations utilize metrics, there are currently no methods or metrics for automatically judging quality of responses generated in human-machine conversational systems. Machine translation may also be referred to as automated language translation. Without a metric for assessing the quality of a machine-generated response, response generation systems cannot be automatically optimized to improve the quality of the machine generated responses.

To improve the quality of the responses, a human user is required to manually review and assess the quality of each machine generated response and manually adjust the response generation system in an attempt to improve the response quality. However, manual human evaluation costs may be prohibitive. Manual human evaluation results may also be inconsistent. Furthermore, manual assessment and tuning cannot scale with production-scale response generation systems having potentially hundreds or thousands of parameters to adjust for optimization of the system. This manual review process is also time consuming, cumbersome, tedious, inefficient, and suboptimal.

SUMMARY

Examples of the disclosure provide a metric for automatically scoring machine-generated conversational responses. In an example, a computer implemented method for automatic assessment of machine generated responses is provided. An extraction component extracts candidate response n-tuples from at least one source of conversational data to form a set of multi-reference responses. Each response in the set of multi-reference responses includes a selected context-message data pair and a rating for each response relative to the selected context-message data pair. A response assessment engine calculates an assessment metric based on a selected machine-generated conversational response and the set of multi-reference responses. The response assessment engine generates a metric score. The metric score indicates a quality of the selected machine-generated conversational response relative to a selected context-message data pair associated with the selected machine-generated response.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is an exemplary diagram illustrating context-message-response triples data sets.

FIG. 4 is an exemplary block diagram illustrating biasing responses based on a context that includes a mood of the user.

FIG. 5 is another exemplary block diagram illustrating biasing responses based on a context that includes a mood of the user.

FIG. 6 is an exemplary block diagram illustrating responses extracted from a source of conversational data based on a context-message pair.

FIG. 7 is an exemplary block diagram illustrating additional context-message-response triples mined from sources of conversational data.

FIG. 12 is a table illustrating a number of triples, average, minimum and maximum number of references for tuning and testing.

Corresponding reference characters indicate corresponding parts throughout the drawings.

DETAILED DESCRIPTION

Figure 1:
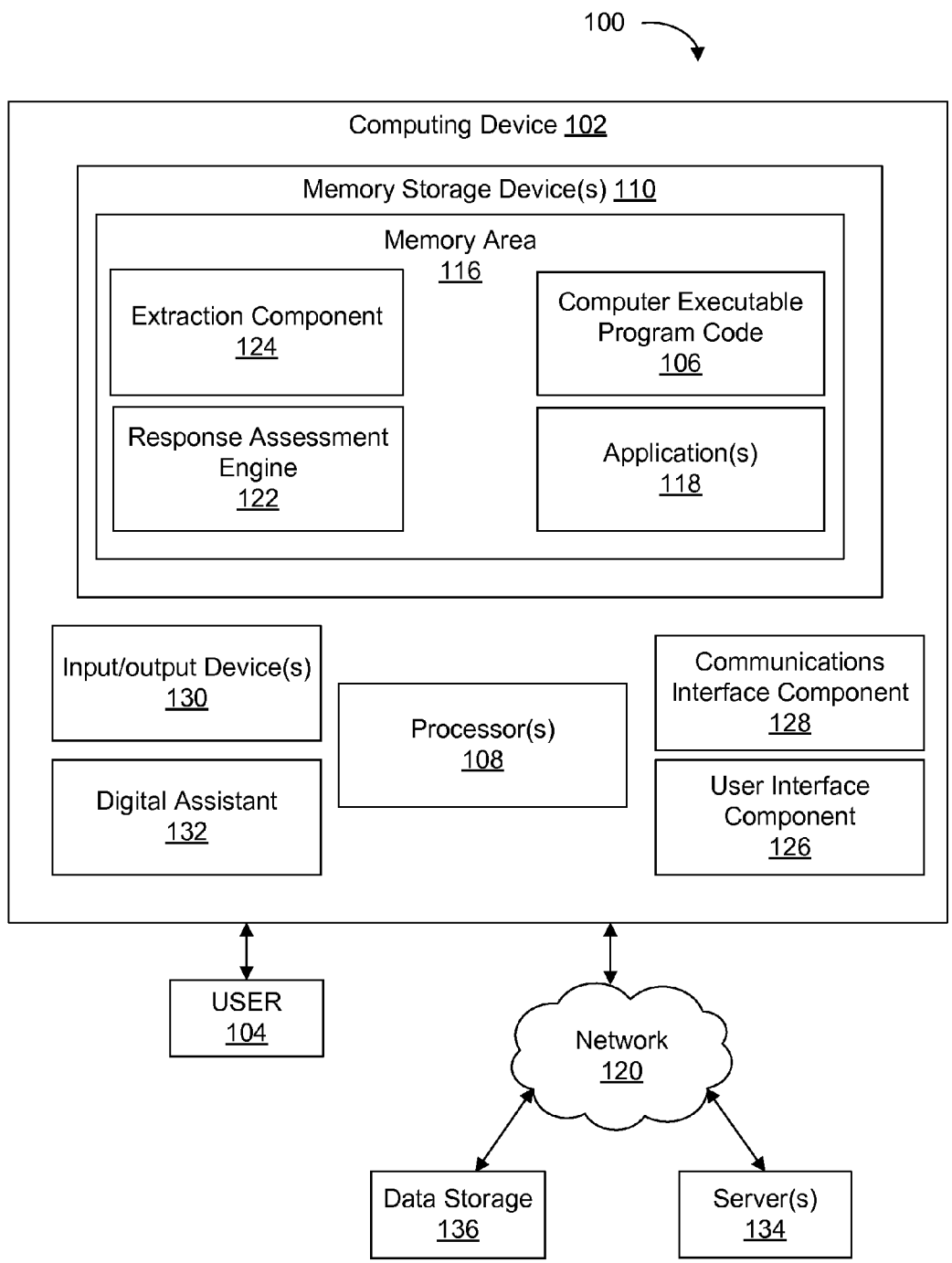
FIG. 1 is an exemplary block diagram illustrating a computing device for automatic assessment of machine-generated responses.

Referring to the figures, examples of the disclosure enable a context-sensitive metric for automatically assessing the quality of machine generated responses in human-machine conversational systems. The response assessment metric enables efficient, automatic evaluation of machine generated responses in a variety of outputs, such as text responses, audio responses, and visual format responses.

In some examples, an extraction component extracts content-message-response n-tuples from at least one source of conversational data to form candidate response n-tuples, where n is an integer. In some examples, a context-message-response n-tuple is a context-message-response triple. A context-message-response triple is a data set that includes a message, a response to the message, and a context in which the message occurred. This context-sensitive extraction of candidate responses improves the accuracy and quality of the automatic assessment engine.

However, the context-message-response n-tuples are not limited to triples. In other examples, the context-messageresponse n-tuple may be a message-response data pair. In other words, the context may be absent or the context may be a null value. In such cases, the context-message-response triple may not include a context value.

The extraction component selects responses from candidate context-message-response triples corresponding to a selected message and context. The selected responses form a set of reference responses. In other words, the extraction component identifies and selects responses from content-message-response triples that have the same or similar message and context. The context-sensitive candidate response extraction and context-sensitive selection of reference responses improves consistency of the response assessment process.

Aspects of the disclosure enable automatic evaluation of machine generated responses by a response assessment engine. The response assessment engine calculates a response assessment metric based on a machine-generated response, a context and message associated with the machine-generated message, and the set of reference responses. The response assessment metric enables intrinsic evaluation of machine generated responses in tasks that admit a diverse range of possible outputs in data-driven machine response generation. This intrinsic evaluation is challenging because the semantic space of possible responses which may be output is broad, resists definition, and is only weakly constrained by conversational inputs.

Aspects of the disclosure further provide a metric score indicating a quality of a machine generated response. The response assessment metric scores further provide more consistent evaluation results and reduce human error that occurs during manual human assessment of machine generated responses.

The metric scores generated by the response assessment engine correlates well with human evaluation scores. The metric scores may be used for automated training and evaluation of data-driven conversation systems, as well as other text and response generation tasks with inherently diverse targets. Moreover, the response assessment engine improves user efficiency by eliminating the need for manual human evaluation of machine generated responses.

In other aspects of the disclosure, the metric score may be used to automatically adjust one or more parameters of a response generation system to improve or otherwise optimize the quality of machine generated responses. The metric score may be used to calibrate a response generation system to achieve a higher or better metric score. As the metric score for responses increases, the quality of responses generated by the response generation system improves. This metric score enables the response generation system to generate more natural, higher quality responses. The assessment can be used to ultimately identify and provide more natural, human-like responses from a digital assistant to a user.

Moreover, the metric may be used for optimizing machine generated responses in devices and applications, such as digital assistants, to improve the accuracy of responses and functions performed by digital assistance. For example, when a user says "I need more" in the context of driving a car where the user's prior message indicated the gas tank is low; the digital assistant makes a more accurate determination that the user message is associated with the purchase of gasoline. The digital assistant is able to make a more pertinent response, such as, "Do you want locations of nearby gas stations?" or "Do you want to find a gas station now?"

The metric may be used in connection with a digital assistant to improve user interaction with the digital assistant and provide improved response to user questions and requests. The digital assistant may provide assistance with obtaining directions, making phone calls, obtaining suggestions for restaurants or entertainment venues, scheduling appointments, updating contact lists/address books, or any other functions associated with a smart phone, tablet, wearable computing device, or any other user device.

Optimizing response generation systems with the metric produces more natural responses that correspond more closely to natural human generated responses. The metric provides for assessment of machine generated response quality which enables generation of higher quality responses which improves the user experience of interacting with digital assistant and other devices utilizing response generation systems. Higher quality machine generated responses also improves overall efficiency of the personal digital assistant or other device utilizing the response generation system. This also improves optimization efficiency and reduces time required to optimize a response generation system.

Referring now to FIG. 1, an exemplary block diagram illustrating a computing device for automatic assessment of machine-generated responses is shown. System 100 is a dialog system for judging the quality of a machine-generated response relative to a user-generated input message.

In the example of FIG. 1, the computing device 102 associated with a user 104 represents any device executing computer executable program code 106 (e.g., as application programs, operating system functionality, or both) to implement the operations and functionality associated with the computing device. The computing device 102 may include a mobile computing device or any other portable device. In some examples, the mobile computing device includes a mobile telephone, laptop, tablet, computing pad, netbook, gaming device, and/or portable media player. The computing device 102 may also include less portable devices such as desktop personal computers, kiosks, tabletop devices, industrial control devices, wireless charging stations, and electric automobile charging stations.

In other examples, the computing device 102 may be embodied within a robot, an automobile, or any other device. Additionally, the computing device 102 may represent a group of processing units or other computing devices.

The computing device 102 has one or more processor(s) 108, one or more memory storage device(s) 110, a set of sensors 112, and input/output device(s) 114. The memory storage device(s) 110 include at least one memory area 116. The memory area 116 includes, for example, but without limitation, computer executable program code 106, application(s) 118, response assessment engine 122, and extraction component 124.

The processor(s) 108 include any quantity of processing units, and is programmed to execute the computer executable program code 106 for implementing aspects of the disclosure. The computer executable program code 106 includes instructions. The instructions may be performed by the one or more processor(s) 108 within the computing device 102, or performed by a processor external to the computing device 102. The one or more processor(s) are programmed to execute instructions such as those illustrated in the figures, such as, FIG. 8, FIG. 9, FIG. 10, and FIG. 11.

In some examples, the processor(s) 108 represent an implementation of analog techniques to perform the operations described herein. For example, the operations may be performed by an analog computing device and/or a digital computing device.

The computing device 102 further has one or more computer readable storage media such as the memory area 116. The memory area 116 includes any quantity of media associated with or accessible by the computing device 102. The memory area 116 may be internal to the computing device 102 (as shown in FIG. 1), external to the computing device (not shown), or both (not shown). In some examples, the memory area 116 includes read-only memory and/or memory wired into an analog computing device.

The memory area 116 stores, among other data, one or more application(s) 118. The application(s) 118, when executed by the processor, operate to perform functionality on the computing device 102. Exemplary application(s) 118 include conversational agents, mail application programs, web browsers, calendar application programs, address book application programs, messaging programs, media applications, location-based services, search programs, and the like. The application(s) 108 may communicate with counterpart applications or services such as web services accessible via a network 120. For example, the application(s) 118 may represent downloaded client-side applications that correspond to server-side services executing in a cloud.

The memory area 116 further stores one or more computer-executable components. Exemplary components include a response assessment engine 122. The response assessment engine 122 component, when executed by the processor of the computing device 102, causes the processor to generate a metric score indicating a quality of a machine-generated response. The machine-generated response may include, without limitation, a text response, a speech response, a gestural response, a graphical response, an actuation or motor function response, or any other type of response.

The memory area 116 may optionally store an extraction component 124. The extraction component 124 is a component for extracting messages, responses and context data from one or more sources of conversational data. A source of conversational data may include social media sources, as well as databases storing conversational data.

In some examples, the extraction component uses an extraction algorithm to cover the space of reasonable responses to be mined from sources of conversational data. Given a test triple (context, message, and response); the extraction component 124 mines other responses that fit the context and message pair ($c_t$, $m_t$).

In one non-limiting example, the extraction component selects a set of fifteen (15) candidate response triples using an information retrieval system. The information retrieval system is calibrated to select candidate response triple for which both the message and the response are similar to a selected message and response.

The computing device 102 may include a user interface component 126. The user interface component 126 includes a graphics card for displaying data to the user 104 and receiving data from the user 104. The user interface component 126 may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component 126 may also include one or more of the following to provide data to the user or receive data from the user: speakers, a sound card, a camera, a microphone, a vibration motor, one or more accelerometers, a Bluetooth® brand communication module, global positioning system (GPS) hardware, and a photoreceptive light sensor. For example, the user 104 may input commands or manipulate data by moving the computing device 102 in a particular way.

The computing device 102 may include a communications interface component 128. The communications interface component 128 includes a network interface card and/or computer-executable instructions (e.g., a driver) for operating the network interface card. Communication between the computing device 102 and other devices may occur using any protocol or mechanism over any wired or wireless connection. In some examples, the communications interface is operable with short range communication technologies such as by using near-field communication (NFC) tags.

Input/output device(s) 130 includes one or more devices for inputting data into the computing device 102 and/or one or more devices for outputting data to the user 104. Input device(s) may include, without limitation, a keyboard, a mouse, a touch screen, a microphone, a camera, a graphical user interface, a pressure sensor, a touch sensor, or any other type of input device. Output device(s) may include, without limitation, a display screen, a graphical user interface, a speaker, an actuator associated with a robot or other mechanical device, or any other type of output device.

The computing device 102 may optionally include a digital assistant 132. A digital assistant 132 may also be referred to as a personal information manager. The digital assistant 132 is a component for managing a user's personal information, telephone functions, schedules, appointments, contacts, favorite restaurants, travel plans, frequent destinations, and any other personal information. Digital assistant 132 includes a conversational agent or other response generation system capable of communicating with the user 104 using natural language responses to user queries and messages.

In this non-limiting example, the computing device 102 may optionally connect to one or more server(s) 134 network 120. The network 120 may include any type of network connection. In one example, the network 120 may be the Internet, an intranet, an Ethernet, or other wireless or hardwired connections by which the computing device 102 may send and receive data associated with one or more server(s) 134. However, other examples do not require network 120.

The computing device 102 may also optionally store and/or access data stored on remote data storage 136. The data storage 136 may be any type of data storage system, such as, but without limitation, a cloud storage system.

Figure 2:
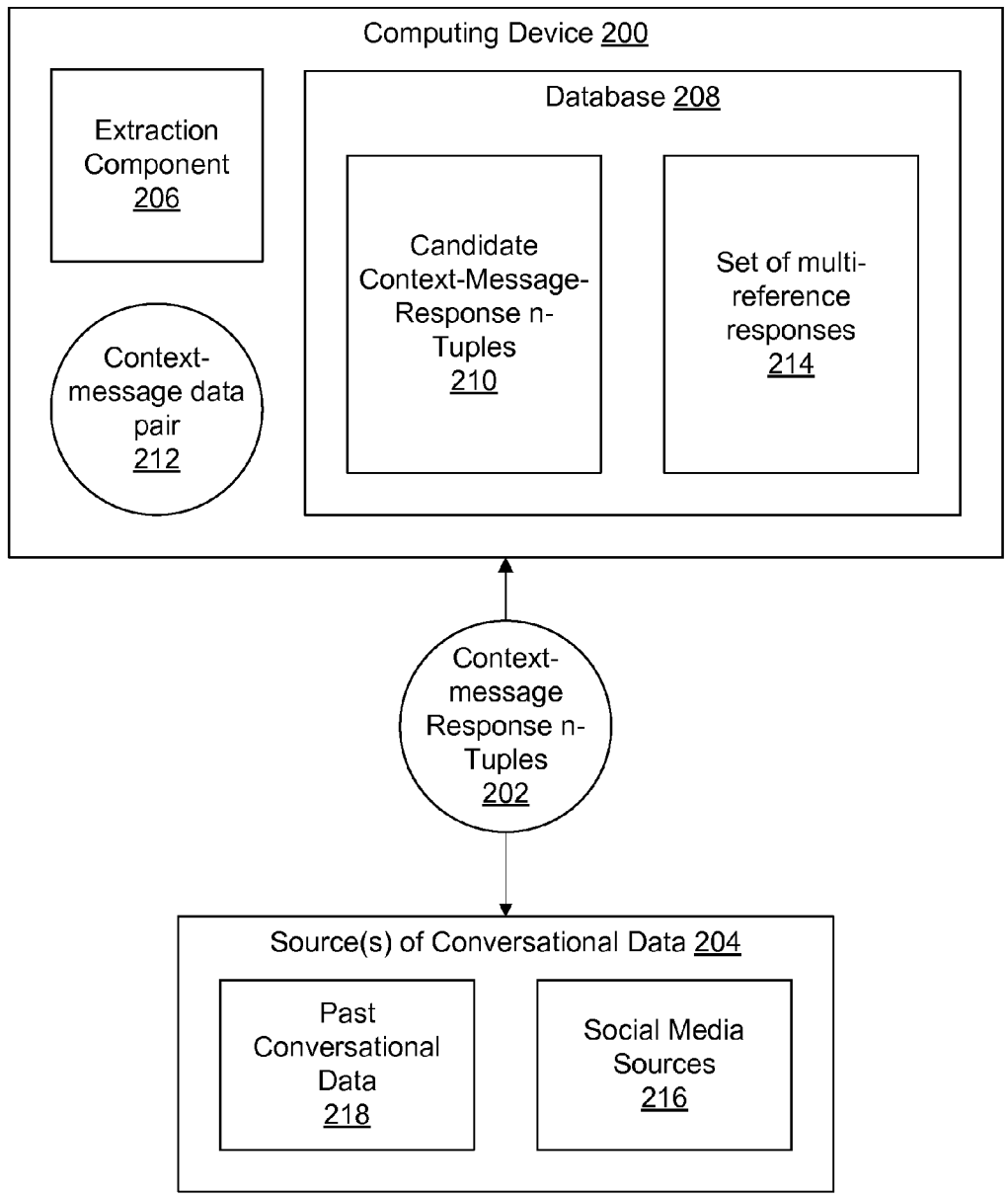
FIG. 2 is an exemplary block diagram illustrating a computing device for extracting a set of reference responses from one or more sources of conversational data.

FIG. 2 is an exemplary block diagram illustrating a computing device for extracting a set of reference responses from one or more sources of conversational data. Computing device 200 is a device for mining context-message-response n-tuples 202 from one or more sources of conversational data 204. A context-message-response n-tuple is a data set that includes a human generated message and a user generated response to the message that is extracted from a source of conversational data. A context-message-response n-tuple may be a context-message-response triple that include a message, a response, and a context of the message.

An example of a context-message-response triple extracted from a source of conversational data 204 may include a context "I'm on my way now"; a message "I'll be downstairs waiting"; and a response "I'll keep an eye out for you."

Extraction component 206 includes an algorithm for extracting relevant responses from one or more source(s) of conversational data. The algorithm is used for extracting relevant responses from source(s) of conversational data, such as social media. The extracted relevant responses are then use as references with a response assessment metric of the response assessment engine 122.

The response assessment metric is a metric for evaluating machine generated responses. The response assessment metric embeds human judgments concerning the quality of reference sentences directly into the computation of corpus-level multiple-reference algorithm(s). The response assessment metric is an automatic metric for performing evaluation of machine generated response.

The response assessment metric may be used to evaluate machine generated responses in a variety of formats. Example formats for responses which may be evaluated using the response assessment metric include, without limitation, text format, audio format, or visual format, such as video, as well as a combination of text, audio, and/or visual formats. A response may be text only, a response that include text and audio, as well as a response that include audio and a visual component, such as video graphics. In other examples, the assessment metric may be used to evaluate a response that includes text format, audio format, and visual format elements.

A written response is a text format. If the response is an audio format, the response may include verbal sounds, such as spoken utterances, as well as non-verbal sounds. A non-verbal sound may include beeps, whistles, cheering, honking, ringing, a bell, a buzzer, clapping, laughing, crying, instrumental sounds, or any other non-verbal audio. A response in a visual format may include a physical gesture or articulation of an apparatus, such as a robot arm or other actuation device, video graphics or an image on a screen or display, and/or any other visual type of response.

In some examples, an extraction equation, such as shown in Equation (1) below, provides that:

$$s(\tilde{r},r)=d(m_{\tilde{v}},m_{\tau})(\alpha d(r_{\tilde{v}},r_{\tau})+(1-\alpha)\epsilon) \quad (1)$$

where s is the score, m is a message, r is a response, d is the bag-of-words similarity function, a controls the impact of the similarity between the responses, and E is a smoothing factor that avoids zero scores for candidate responses that do not share any words with the reference response. This formula provides references that are both diverse and plausible. Given a set of candidate triples, human evaluators rate the quality of the response within the new triples.

The responses may be rated by the human evaluators on any type of scale. In some examples, reference strings are scored for quality by human raters on a scale of negative one to positive one to weight multi-reference responses. However, in other examples, the rating may be on a scale of one (1) to five (5).

In one non-limiting example, reference responses receiving a human rating within an upper range are retained. For example, reference responses receiving a human rating score that is four or better on a five (5) point scale may be retained.

The extraction component 206 is executed by one or more processor(s) to perform the extraction of context-message-response n-tuples 202. The extraction component 206 then identifies the relevant responses from the extracted context-message-response triples for use by the response assessment engine judging machine-generated responses.

Source(s) of conversational data 204 include human generated messages and corresponding human generated responses in any available format. Example of formats include, without limitation, text format, audio format, or visual format, such as video. Thus, a written message and response is a text format. If the response is an audio format, the message and response are spoken utterances. A message and response in a visual format may include a gestural message, and/or a gestural response. An example of a gestural response may include, without limitation, a wink, a frown, a thumbs-up sign, sign language, a hand waving good-bye, or any other movement, motion, gesture, facial expression, posture, or other movement indicating a message or response.

The message and response may likewise include multiple formats. In other words, a human generated spoken message may correspond to a human generated gestural response, such as a change in facial expression. For example, a human generated message "good-bye" may correspond to a human generated response "hand wave gesture" where the hand wave indicates goodbye or farewell response to the spoken utterance "good-bye".

In some examples, the extraction component 206 may store extracted context-message-response n-tuples(s) 202 in a database 208. The database 208 may be any type of data storage for storing context-message-response n-tuple(s) 202.

The extracted context-message-response triple(s) are candidate context-message-response n-tuples 210. The extraction component 206 selects two or more candidate context-message-response n-tuples 210 corresponding to a context-message data pair 212 to form a set of multi-reference responses 214. The context-message data pair 2212 includes a human generated message and context of the message.

The context of a message includes linguistic context data and non-linguistic context data. Linguistic context data includes message-response data pairs preceding the selected message and the selected machine-generated conversational response in a given conversation. Linguistic context data is past dialog history of a user within a given conversation.

Non-linguistic context data includes data associated with the user. Non-linguistic data may include a user's likes and dislikes, preferences, favorite songs, songs that are disliked, the user's friends, significant other, birthdays, anniversaries, holidays, appointments, hobbies, scheduled events, etc.

Non-linguistic context data may also include environmental data derived from one or more sensor devices. For example, non-linguistic context data may include a current temperature, weather forecast, speed or orientation of a vehicle associated with the user, orientation of a device, location information from a global positioning system (GPS) enabled device, camera data, audio data from a microphone or other audio device, pressure sensor data, infrared sensor data, or any other type of non-linguistic data.

In this example, the context-message data pair 212 is a human generated message and a conversational context of the message. The context-message data pair 212 is associated with a machine-generated response. Thus, the extraction component is extracting context-message-response n-tuple(s) 202 in a context-sensitive manner to form the set of multi-reference responses 214. In other words, the set of multi-reference responses 214 includes human generated responses that correspond to the same or similar message and context as the machine-generated response.

For example, if a machine-generated response "good luck" is generated in response to a context-message data pair that includes "got to study" and context "school exams", the extraction component will select context-message response triple(s) that include responses corresponding to the same or similar context-message data pair for messages related to "study/studying" and context related to "exams/tests". In this manner, the extraction component 206 performs the extraction and selection of the set of multi-reference responses in a context-sensitive manner that takes into account the context of each message and corresponding result identified from the source(s) of conversational data 204.

Source(s) of conversational data 204 may include social media sources 216 and/or past conversational data 218. A social media source may be any available source of social media, such as, for example but without limitation, social networking data feeds, video chat, video conferencing, instant messaging, or any other social media source.

In other examples, source(s) of conversational data 204 includes one or more databases storing context-message-response triples generated by human users. For example, past conversational data 218 may include context-message-response triples generated by the user in past conversations. In still other examples, source(s) of conversational data 204 includes one or more databases storing context-message-response triples already extracted from one or more sources of conversational data.

FIG. 3 is an exemplary diagram illustrating context-message-response triples data sets. Context-message-response n-tuples 202 are exemplary sets of data extracted from one or more source(s) of conversational data 204.

A context-message-response n-tuple is a data set containing data associated with a response. In some examples, the context-message-response n-tuple is a triple. For example, a context-message-response triple in context-message-response triples include a message, a corresponding response to the message, and a context of the message. In this example, context-message-response triple 302 includes a human generated message 304, a context 306 of the message 304, and a human generated response to the message 308. Context-message-response triple 310 includes context 312, message 314, and response 316. Context-message-response triple 318 includes context 320, message 322, and response 324.

The context-message-response triples may be extracted from a social media source, such as, but not limited to, social networking data feeds. The extraction component 206 identifies and selects or filters the context-message-response triples in accordance with a selected message and a selected context, such as selected context-message pair 212 to generate a set of multi-reference responses.

In some examples, the extraction component 206 mines sets of multiple reference strings. This approach consists of mining conversational responses from social media, for example, social networking data feeds or any other source of conversational data.

In this non-limiting example, the extraction component 206 identifies conversational triples (context, status, response), in social media and/or other sources of conversational data. In some social media sources, for example, these triples are identified by the fact that any social media user may address her message to a particular user. Millions of conversational triples may be mined in this manner.

Context in this example may represent a chain of arbitrary length comprising message-response pairs preceding a given message and response that occurs during the current conversation. Context may also include non-linguistic information, such as location, date, time of day and other externally available information that is pertinent to the conversation. This extraction technique provides at least one reference response for each context-message pair.

In another example, the extraction component 206 mines other responses that fit a selected context and message pair. To this end, the extraction component 206 selects a large number of candidate triples using an information retrieval system. To minimize the risk of obtaining low scores from human evaluation, the extraction component 206 is calibrated in order to select candidate triples for which both the message and the response are similar to the original or selected message and response pair.

FIG. 4 is an exemplary block diagram illustrating biasing responses based on a context that includes a mood of the user. The conversational context may include a mood of the user. The mood refers to the emotional state of the user. For example, the mood of the user may be, without limitation, happy, sad, neutral, angry/hostile, cool, anxious, nervous, calm, passionate, impatient, sleepy/tired, or any other emotional state. In this example, the conversational context includes a neutral mood for the user. The mood may be determined based on one or more sources of context data. The user's mood may be determined based on audio data, video data, time of day, temperature, input messages typed by the user, words spoken by the user, gestures made by the user, facial expression, as well as any other types of context data.

For example, audio data may be used to determine mood based on the user's voice. The user's mood may be determined based on voice stress, fluctuations in voice, volume, pitch, inflections, or any other factors associated with the user's voice.

The mood of the user may also be determined based on visual data. For example, the user's mood may be determined based on facial expression, pupil dilation, body posture, body movements, etc.

Mood may also be determined based on words spoken or typed by the user. In still other examples, mood may be determined based on two or more signals received from two or more sensors. For example, mood may be determined based on a combination of audio data received from an audio sensor, visual data received from one or more cameras, as well as prior messages/statements by the user during the current conversation.

In this non-limiting example, the user mood is neutral. The response generation system generates a response to the user input message 400 based on the context, including the user mood. The response may be generated in real-time or selected from a set of pre-generated responses 402 based on the mood and/or other context data associated with the user.

FIG. 5 is another exemplary block diagram illustrating biasing responses based on a context that includes a mood of the user. In this example, the context data indicates the user mood is happy. The response generation system generates a response to the user generated message 500. In this non-limiting example, the response generation engine selects the response from a set of pre-generated responses 502 in accordance with the context, including the user mood. In other embodiments, the response may be generated in real-time.

FIG. 6 is an exemplary block diagram illustrating responses extracted from a source of conversational data based on a context-message pair. An extraction component extracts one or more responses from a source of conversational data that correspond to a selected context and message. In this non-limiting example, a selected context 602 is based on a prior statement "Doubt it! What do you look like?" The selected message 604 is a user generated message "Look at my pics. I have some there." The set of responses 606 are responses identified from the context-message-responses having the same or similar context and message as context 62 and message 604.

FIG. 7 is an exemplary block diagram illustrating additional context-message-response triples. Context-message-response triples 702, 704, 706, 708, 710, and 712 are non-limiting examples of context-message-response triples mined from one or more sources of conversational data.

Figure 8:
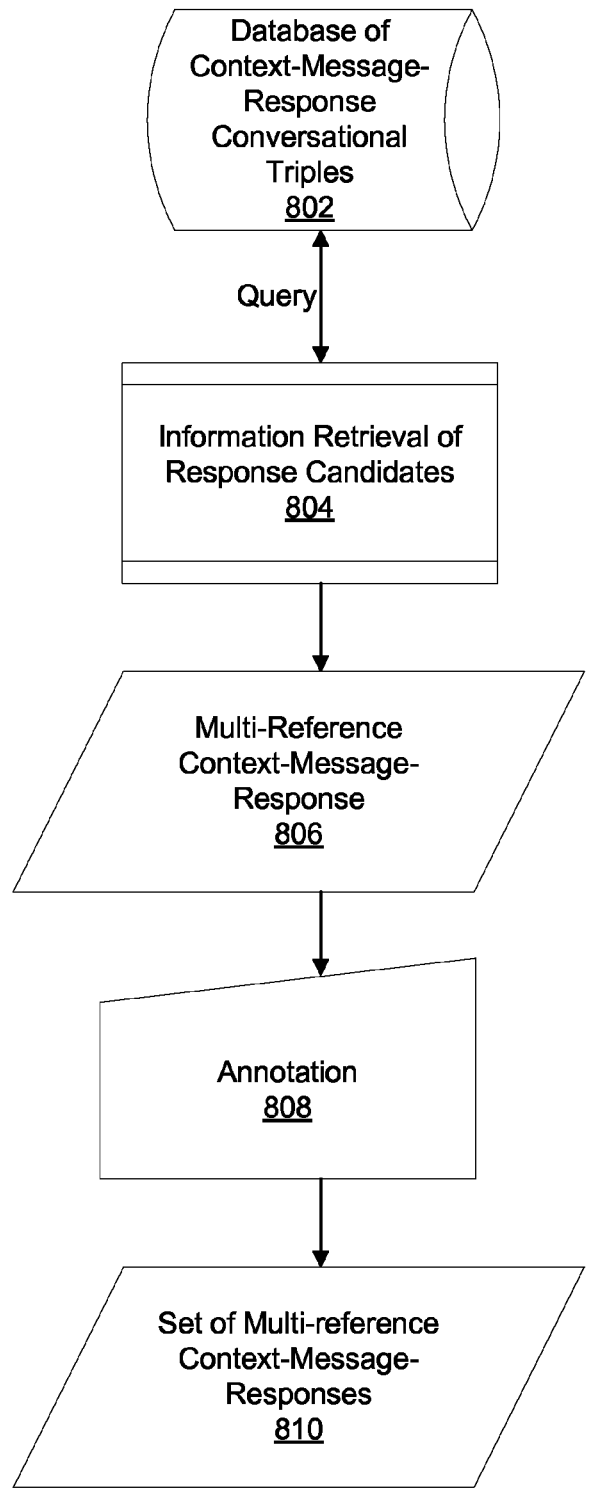
FIG. 8 is an exemplary block diagram illustrating generation of a set of multi-reference responses.

FIG. 8 is an exemplary block diagram illustrating generation of a set of multi-reference responses. The extraction component 206 performs one or more queries on database of context-message-response conversational triples 802. The database of context-message-response conversational triples 802 may be a database, such as database 208 in FIG. 2.

The extraction component 206 performs information retrieval of response candidates 804 to generate a multi-reference context-message-response 806. In other words, the extraction component 206 performs information retrieval to extract or select a single context-message-response triple from the plurality of response candidates 804. The retrieved multi-reference context-message-response 806 is reference response identified and/or retrieved based on a selected context and a selected human generated message associated with a given machine generated response to be judged by the response assessment engine 122. The multi-reference context-message-response 806 may be a reference response set of reference responses, such as set of multi-reference responses 214 in FIG. 2.

The more references in set of multi-reference responses 214, the greater the correlation with human judgment. However, gathering multiple references is difficult in the case of conversational data. Conversational data gathered from naturally occurring conversations typically offer only one response per user generated message. In other words, for each user generated message, there is usually only one single response to that message.

In some examples, an extraction component may mine messages that occur multiple times in conversational data in an attempt to find distinct responses to a given message. However, this solution is not ideal because responses often depend directly or indirectly on dialog history. And although it is possible to have writers create additional references where the downstream task is relatively unambiguous, this approach presents difficulties in the case of more subjective tasks, such as conversational response generation.

Therefore, in other examples, the extraction component mines candidate responses from source(s) of conversational data and have the mined candidate responses rated by one or more judges. The multi-reference context-message-response 806 receives an annotation 808. The annotation 808 in this example is a rating selected, created, or assigned by one or more human users. In other words, one or more judges rate each response in the multi-reference context-message-response triples 806 to create the annotation.

The judges rate the quality of each of the reference responses using a rating system. A judge rates the reference responses based on one or more criteria. The criteria for rating the pertinence of a response may include criteria, such as, but without limitation, conversational context, length of the response, the intent, the mood, the content of the response, grammar, syntax, inflections, accuracy of response, similarity of the response to one or more other responses, overall pertinence of the response to a corresponding message, or any other criteria.

In some examples, a judge is a human judge. In other examples, a judge may be a computer judge. A computer judge may include computer hardware, computer software, or a combination of hardware and software.

In this example, the rating is a score within a scale between negative one and positive one. In other words, the rating is a score or other indicator on a continuous scale from negative one (−1) to positive one (+1).

Thus, the assessment metric in this example relies on both positive examples and negative examples to produce the metric score quantifying the pertinence of the machine generated response to a given message and/or context of the given message. A positive example used by the assessment metric is a positively rated reference response. A negative example used by the metric is a bad, negatively rated reference response.

However, in other examples, the rating may be a score on a different scale. For example, the annotation 808 may be a rating on a scale from one (1) to five (5), a rating on a scale from one (1) to ten (10), or a rating on any other scale.

The multi-reference context-message-response 806 is added to a set of multi-reference context-message-responses 810. The set of multi-reference context-message-responses 810 in this example includes two or more multi-reference context-message-responses. The set of multi-reference context-message-responses 810 is used by the response assessment engine to generate a metric score for the given machine generated response.

Figure 9:
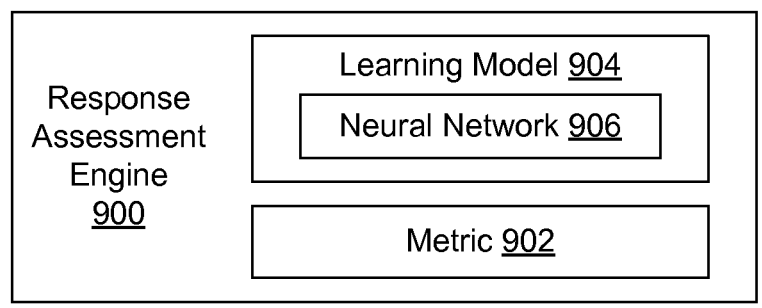
FIG. 9 is an exemplary block diagram illustrating a response assessment engine.

FIG. 9 is an exemplary block diagram illustrating a response assessment engine. The response assessment engine 900 is a component, executed by one or more processors, to calculate an assessment metric 902 based on a machine generated response, a context-message data pair, and the selected, context-sensitive set of multi-reference responses 214.

The assessment metric 902 is a metric for scoring a given conversational response against the set of multi-reference responses 214. In this example, the assessment metric 902 is a tunable metric.

The assessment metric 902 is sensitive to the conversational context of the machine generated response that is being assessed or judged by the response assessment engine. This context-sensitivity stems from the fact that the extraction algorithm of the extraction component 124 mines related responses from sources of conversational data considering the context in which these candidate responses were produced.

An exemplary assessment metric, such as assessment metric 902, is shown in Equation (2) below, which is as follows:

$$\text{score}(Y, R_1, \ldots, R_N) = \frac{1}{Z}\exp\left(\sum_{i=1}^{N} s_i \times \text{overlap}(Y, R_i)\right) \quad (2)$$

where the score $(Y, R_1, \ldots R_N)$ is the metric score generated by the response assessment engine 900.

As shown in equation (2) above, exp ( ) is the exponential function. The normalization score Z ensures the output metric score of the machine generated response Y is defined between zero (0) and one (1).

The rating "$S_i$" is the human rating between negative one (−1) and positive one (+1). The overlap $(Y, R_i)$ is the amount of n-gram (word sequence) overlap between the machine generated response Y and the one or more reference responses $(R_i)$. An overlap of zero (0) means there are no words in common between the machine generated response "Y" and one or more reference responses $(R_i)$. An overlap of one (1) means the two are identical.

Overlap between the candidate reference and positively rated responses $(S_i>0)$ contribute to increasing the metric score. A positively rated response is a higher quality response. Positively rated response may be referred to as a good response.

The quality of a response may be judged based on whether the response is pertinent or relevant given a context of the conversation, whether the response is grammatically correct, whether the response is a natural response that matches or corresponds to a human response, whether the response is syntactically correct, how well the context of the response matches that of the pair, how well the content of the response matches that of the pair, how closely the language, mood, dialect, and syntax of the response matches that of the pair, and/or how well the response matches what a human would say in the same or similar context. Thus, a positively rated response is a response that is relevant to the message and/or context, grammatically correct, syntactically correct, pertinent to the overall conversation, and/or a response that is the same or similar to a natural, human generated response.

Overlap with negatively rated responses ($S_i<0$) contributes to lowering the metric score. A negatively rated response may be referred to as a sub-optimal response. A negatively rated response may be referred to as a bad response.

A sub-optimal response is a response that contains poor grammar and/or incorrect/improper syntax, irrelevant relative to a given message, inappropriate given a context of the current conversation, and/or dissimilar to natural, human generated responses to the same or similar message and/or conversational context.

Another exemplary response assessment metric for evaluating conversation responses is shown in equations (3)-(5) below. Given an input message m and a prior conversation history c, the goal of a response generation system is to produce a hypothesis h that is a high quality response to the message. The assessment metric assumes that a set j of reference $\{r_{i,j}\}$ is available for the context c and message m, where i∈{1 . . . I} is an index over the test set. In this case, the automatic score of the system output hi . . . in is defined as shown in exemplary Equations (3) and (4) below:

$$BP \cdot \exp(\Sigma_n \log p_n) \quad (3)$$

The "n" in equation (3) represents a size of the n-gram order. The p in equation (3) represents the n-gram precision.

The hypothesis is represented by p in equation (4) as follows:

$$BP = \begin{cases} 1 & \text{if } n > p \\ e^{(1-\frac{p}{n})} & \text{otherwise} \end{cases} \quad (4)$$

where p represents the hypothesis and n represents a length of the reference. In the equations, the reference length n of equation (4) is not the same as the n-gram order size n shown in equation (3). Likewise, the p in equation (3) represents the n-gram precision while the p in equation (4) represents the hypothesis.

Then corpus-level n-gram precision $p_n$ is defined in exemplary equation (5) below as:

$$p_n = \frac{\Sigma_i \Sigma_{g \in n\text{-}grams(h_i)} \max_{j: g \in r_{i,j}} \{w_{i,j} \cdot \#_g(h_i, r_{i,j})\}}{\Sigma_i \Sigma_{g \in n\text{-}grams(h_i)} \max_j \{w_{i,j} \cdot \#_g(h_i)\}} \quad (5)$$

where $\#_g(\ )$ is the number of occurrences of n-gram g in a given sentence and $\#_g(u,v)$ is shorthand for min $\{\#_g(u), \#_g(v)\}$.

The response assessment metric exploits human qualitative judgments $w_{i,j} \in [-1,+1]$. The metric is discriminative because it both rewards matches with good reference responses having positively rated responses and penalizes matches with bad, negatively rated reference responses.

The metric shown in equation (5) weights each n-gram match by the highest scoring reference in which it occurs. This weight may be negative. In some examples, to ensure that the denominator is never zero (0), the metric assumes that for each i there is at least one reference $r_{i,j}$ whose weight $w_{i,j}$ is strictly positive.

In some examples, the maximum theoretical score is one (1). For example, if a hypothesis matches the highest weighted reference for each sentence, the numerator equals the denominator and the metric score becomes one. This metric may be utilized for automatic assessment of response generation, such as but without limitation, in conversational response generation, machine translation, and image captioning.

Response assessment metric 902 is applicable to Minimum Error Rate Training (MERT). The response assessment metric may also be used with pair wise ranking optimization (PRO), maximum entropy models (maxent), Margin Infused Relaxed Algorithm (MIRA), or any other learning algorithms as alternative to Minimum Error Rate Training. That is, one may use it to tune the parameters of a response generation system. This has the effect of making system output more similar to good responses and less similar to bad or sub-optimal responses.

In this example, the response assessment engine 900 is a separate component from the response generation system. In fact, in some examples, the response assessment engine 900 may be located on a separate physical computing device than the computing device associated with the response generation system generating the machine-generated responses. In such examples, the response assessment engine 900 may receive machine generated responses and/or context-message pair data from one or more computing devices via a network, such as network 120 shown in FIG. 1.

The conversational response in this example is a machine generated response. The response assessment engine 900 optionally includes a learning model 902 for generating an assessment score for a machine generated response. In some examples, the learning model 904 includes a neural network model 906.

In other examples, the learning model 904 may optionally include functionality associated with a response generation system for generating machine generated responses to be scored by the response assessment engine. In other words, in some examples, the response generation system and response assessment engine may be embodied within a single component instead of two separate components.

Figure 10:
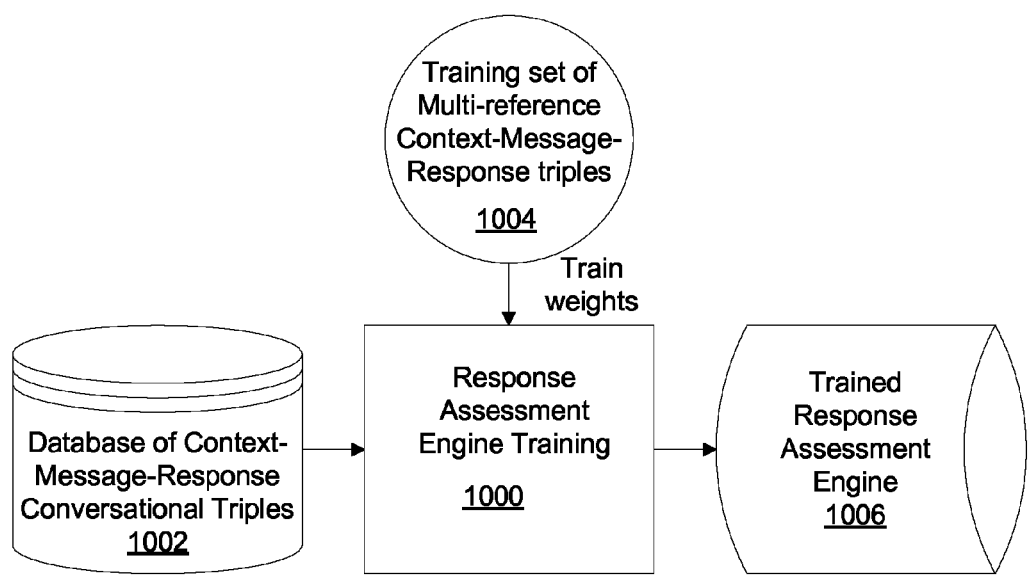
FIG. 10 is an exemplary block diagram illustrating response assessment engine training.

FIG. 10 is an exemplary block diagram illustrating response assessment engine training. Response assessment engine training 1000 is a component for generating a metric score for a given machine generated response undergoing training. The response assessment engine training 1000 utilizes context-message-response conversational triples from a database 1002. The database may be any type of database or data storage device for storing data, such as, but without limitation, database of context-message-response conversational triples 402 in FIG. 4.

In this example, the response assessment engine 1000 is trained based on a training set of multi-reference context-message-response triples 1004. The training set of multi-reference context-message-response triples 1004 provide training weights for adjusting one or more parameters associated with response assessment engine 1000. Upon completion of this process, the trained response assessment engine 1006 is ready to generate metric scores for machine generated responses.

Figure 11:
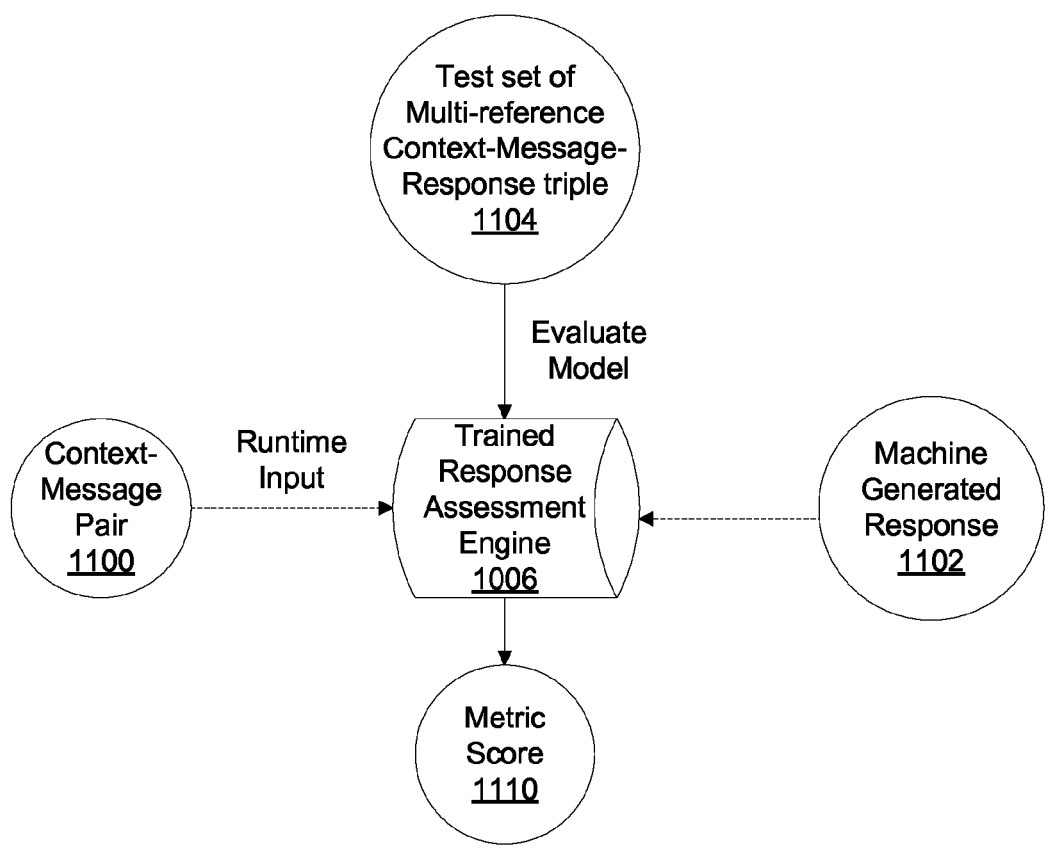
FIG. 11 is an exemplary block diagram illustrating response assessment engine generation of a metric score for a machine generated response.

FIG. 11 is an exemplary block diagram illustrating response assessment engine generation of a metric score for a machine generated response. The trained response assessment engine 1006 receives a context-message pair 1100, a machine generated response 1102, and a test set of multi-reference context-message-response triples 1104 as input to the response assessment engine 1006.

In some examples, the assessment metric 902 utilizes n-gram overlap metrics. These n-gram overlap metrics require multiple reference strings, such as set of multi-reference responses 1108.

For a given user input message and conversational context, the assessment metric 902 of the response assessment engine 1006 assumes that a set of one or more reference responses ($R_1$, . . . , $R_N$) from a set of multi-reference responses is given. Each reference response in the set of reference responses is rated by humans with a score between negative one (−1) and positive one (+1). If the responses are rated on a different scale (e.g., 1 to 5), scores are normalized to be in the range between negative one (−1) and positive one (+1).

The trained response assessment engine 1006 calculates a metric based on the context-message pair 1100, a machine generated response 1102, and the test set of multi-reference context-message-response triples 1104 to generate the metric score 1110.

The metric score 1110 indicates the level of quality of a given machine generated response 1102 relative to the context-message pair 1100. Low quality machine generated responses may occur, for example, where a variety of machine generated response outputs are acceptable or even desirable. Tasks with intrinsically diverse targets may include, without limitation, machine translation, summarization, sentence compression, paraphrase generation, and generation of conversational interactions. A major hurdle for these tasks is automation of evaluation because the space of plausible outputs may be quite large. The response assessment metric provides an automatic evaluation of quality of these outputs.

The quality of the response outputs indicates, for example but without limitation, whether the machine generated response is the same or similar to natural, human generated responses to the same or similar message and/or conversational context, whether the response is appropriate given the overall context of the conversation, whether the response is pertinent to the message associated with the response, and/or whether the response is grammatically/syntactically correct.

The metric score may be a score on any scale for scoring quality of machine generated responses. In some examples, the metric score may be in a range from zero (0) to one (1). In other examples, the metric score may be in a range from one to five. The metric score may be a score on a scale from one (1) to ten (10). In other examples, the metric score can range from negative one (−1) to positive one (+1). A lower metric score indicates that the response is not relevant to the pair and can be discarded. A higher metric score indicates that the response is relevant to the pair and can be selected as a response output to the digital assistant.

The metric score 1110 in some examples may be used to automatically optimize a response generation system. Using optimization techniques, such as minimum error rate training (MERT) for example, the parameters of a response generation system are updated to make system output incrementally more similar to positively rated, higher quality responses and less similar to negatively rated, sub-optimal responses. The metric score 1110 is utilized to update a set of one or more parameters associated with the response generation system. In other examples, the set of parameters may be updated based on two or more metric scores associated with one or more machine generated responses.

Thus, the response assessment metric may be used to optimize response generation systems to improve the quality of machine generated responses. A high quality machine generated response is a response that is, for example but without limitation, appropriate given a context of a conversation, relevant to the preceding user generated message, grammatically correct, syntactically correct, and/or like a natural, human formulated response.

FIG. 12 is a table illustrating a number of triples, average, minimum and maximum number of references for tuning and testing. In this multi-reference extraction example, candidate triples are selected using an information retrieval system. The information retrieval system is calibrated to select candidate triples for which both the message and response are similar to a selected message and selected response. A rating of the quality of each response in the set of candidate triples. References having a score of four (4) or better on a five (5) point scale are retained for references. As shown in table 1200, this results in 3.58 references per example on average. The average lengths for the response in the multi-reference tuning and test sets are 8.75 and 8.13 tokens respectively.

Figure 13:
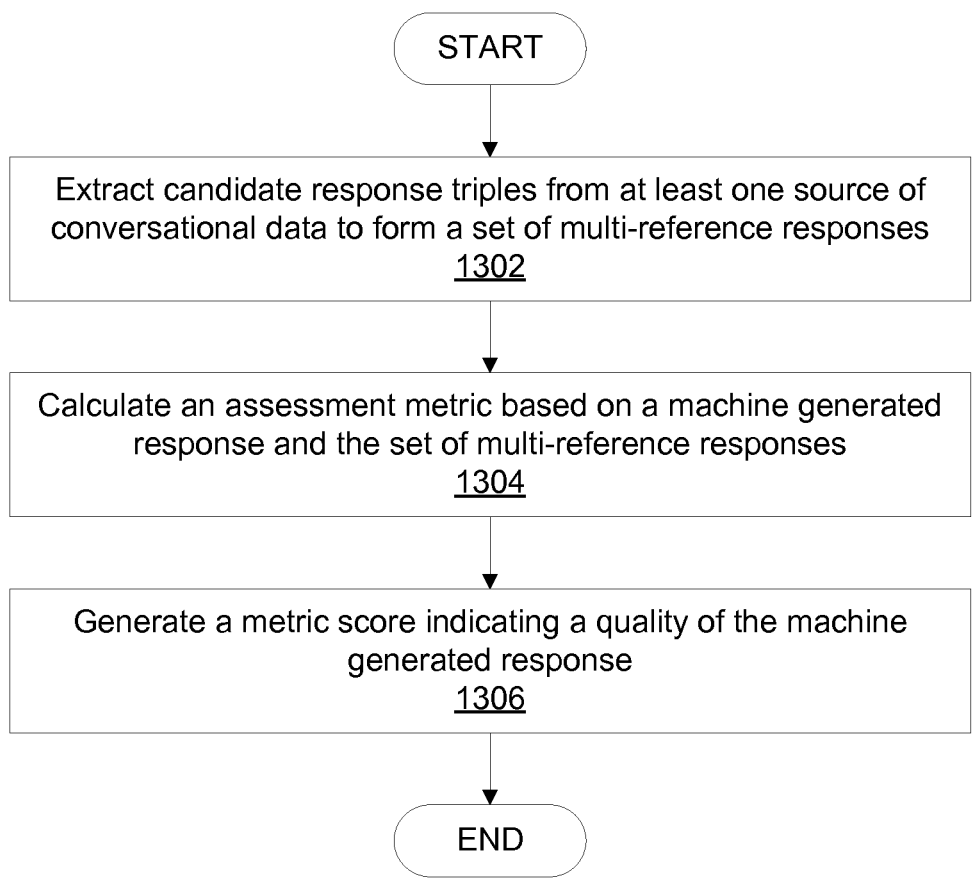
FIG. 13 is a flow chart illustrating operation of the computing device to generate a metric score for a machine generated response.

FIG. 13 is a flow chart illustrating operation of the computing device to generate a metric score for a machine generated response. The process depicted in FIG. 13 may be implemented by a computing device, such as, but without limitation, computing device 102 in FIG. 1 and/or computing device 200 in FIG. 2.

The process begins by extracting candidate response triples from at least one source of conversational data to form a set of multi-reference responses at 1302. An assessment metric is calculated based on a machine generated response and a set of multi-reference responses at 1304. A metric score indicating a quality of the machine generated response is generated at 1306 with the process terminating thereafter.

Figure 14:
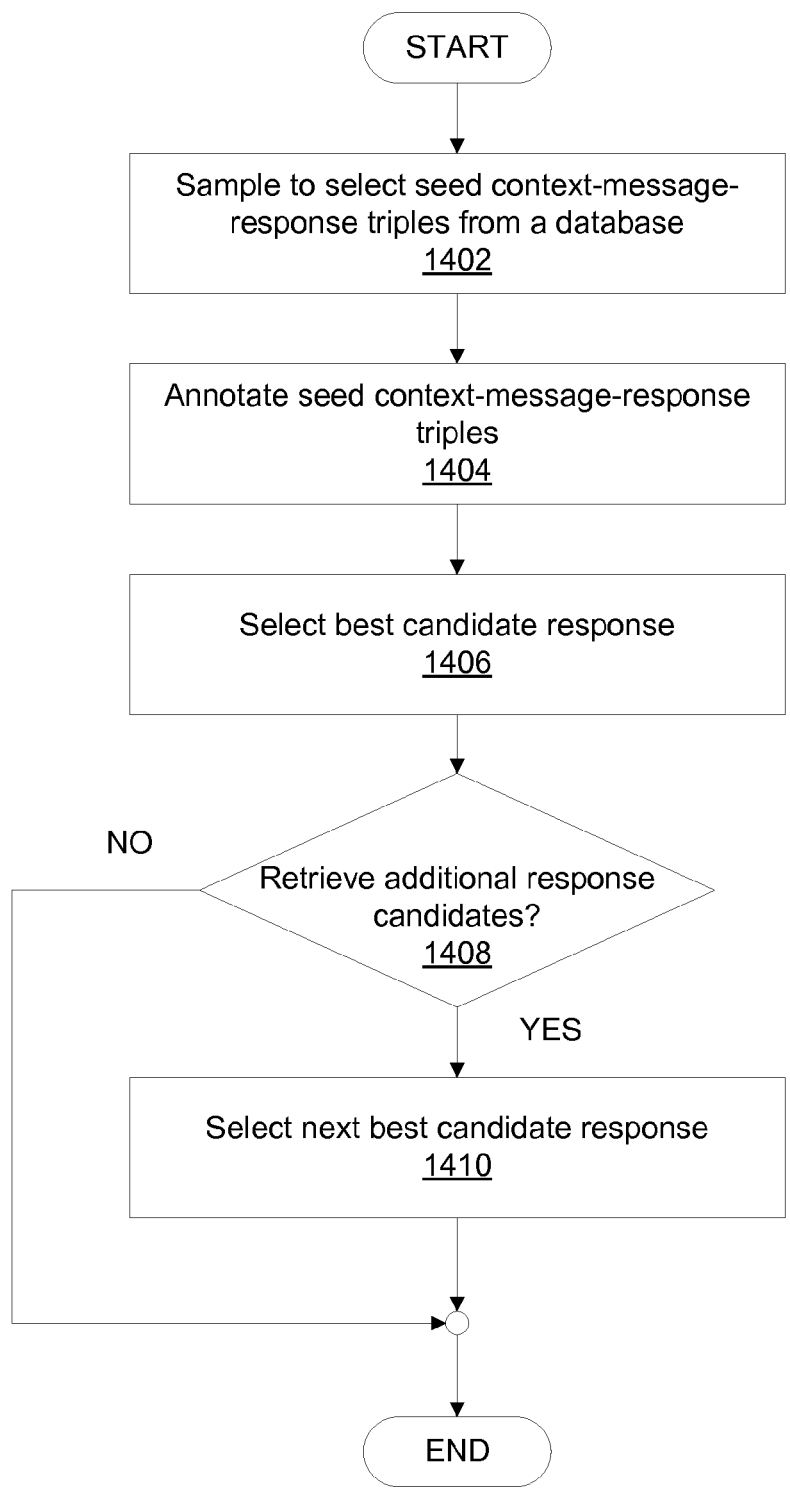
FIG. 14 is a flow chart illustrating operation of the computing device to extract a plurality of candidate responses from one or more source(s) of conversational data.

FIG. 14 is a flow chart illustrating operation of the computing device to extract a plurality of candidate responses from one or more source(s) of conversational data. The process depicted in FIG. 14 may be implemented by a computing device, such as, but without limitation, computing device 102 in FIG. 1 and/or computing device 200 in FIG. 2.

The process begins by sampling context-message-response triples from a database to select seed context-message-response triples at 1402. The seed context-message-response triples are annotated at 1404. An annotation may include a rating for each candidate response. The rating in some examples is a human generated rating.

A best candidate response is selected at 1406. A best candidate response may be a response corresponds to a selected context-message data pair.

A determination is made as to whether to retrieve additional response candidates at 1408. If yes, a next best candidate is selected from the context-message-response triples from the database at 1410 with the process terminating thereafter.

Returning now to operation 1408, on determining no additional response candidates are to be retrieved, the process terminates thereafter.

Figure 15:
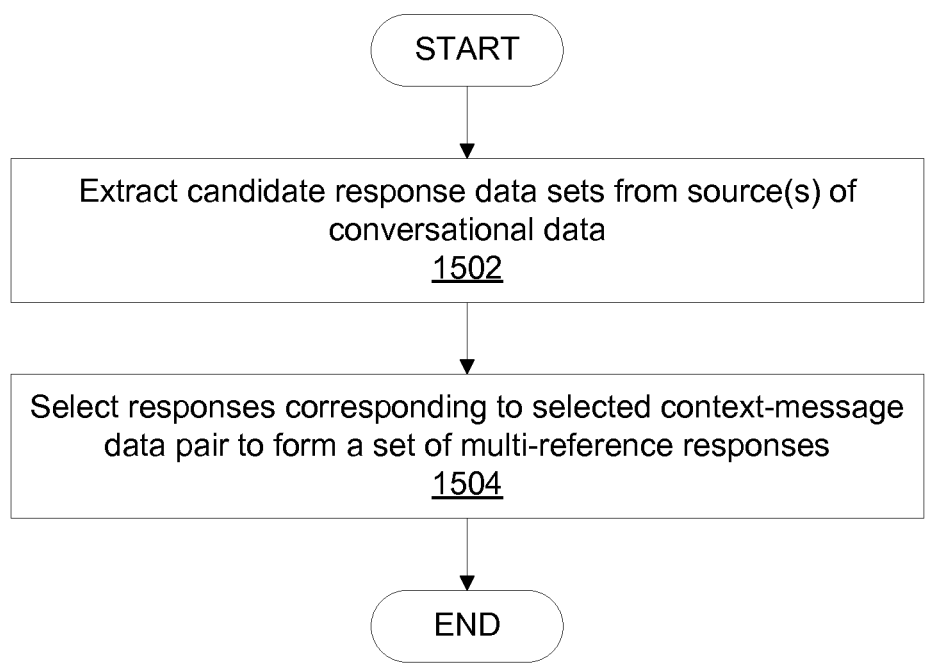
FIG. 15 is a flow chart illustrating operation of the computing device to select a set of multi-reference responses.

FIG. 15 is a flow chart illustrating operation of the computing device to select a set of multi-reference responses. The process depicted in FIG. 15 may be implemented by a computing device, such as, but without limitation, computing device 102 in FIG. 1 and/or computing device 200 in FIG. 2.

The process begins by extracting candidate response triples from source(s) of conversational data at 1502. Responses corresponding to selected context-message are selected to form a set of multi-reference responses at 1504 with the process terminating thereafter.

Figure 16:
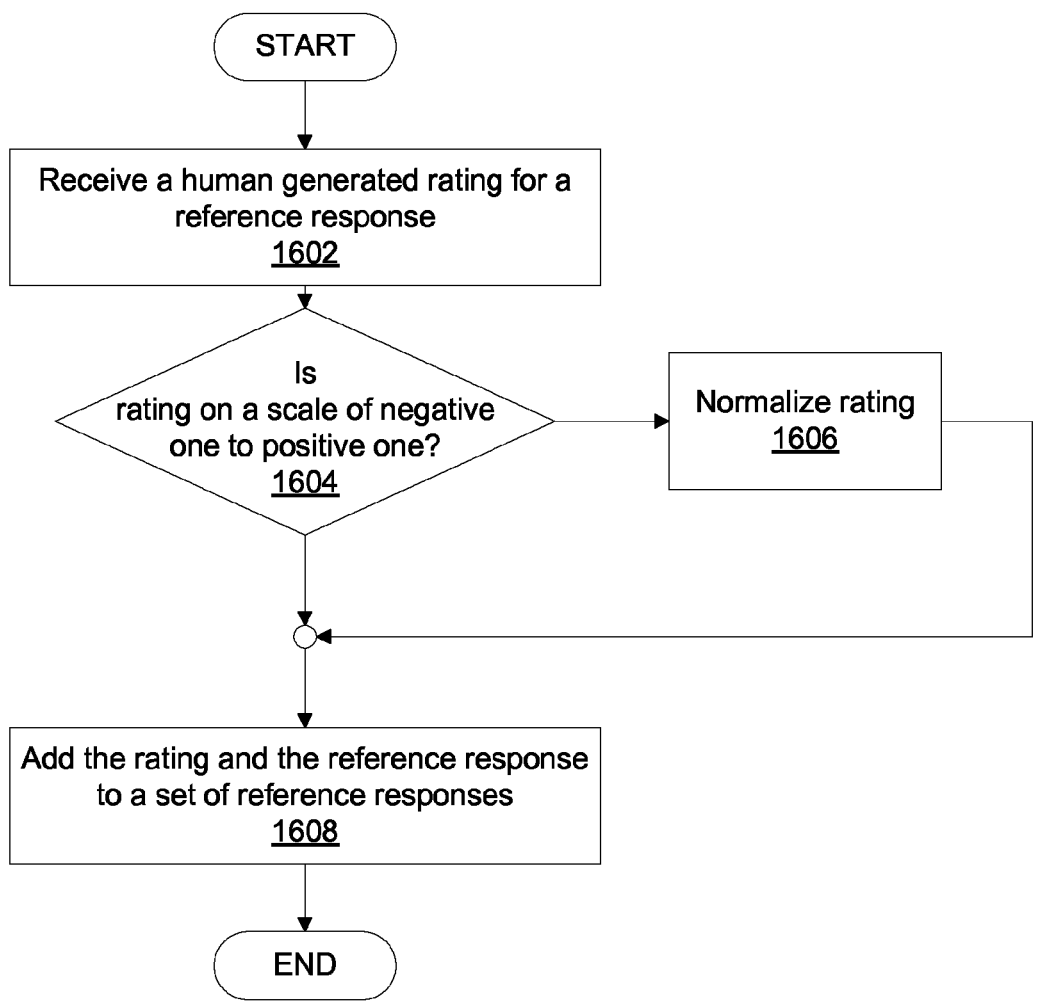
FIG. 16 is a flow chart illustrating operation of the computing device to access a rating for each response in a set of multi-reference responses.

FIG. 16 is a flow chart illustrating operation of the computing device to access a rating for each response in a set of multi-reference responses. The process depicted in FIG. 16 may be implemented by a computing device, such as, but without limitation, computing device 102 in FIG. 1 and/or computing device 200 in FIG. 2.

The process begins by receiving a human generated rating for a reference response at 1602. A determination is made as to whether the rating is on a scale of negative one to positive one at 1604. If yes, the rating is added to the reference response in a set of multi-reference responses at 1606 with the process terminating thereafter.

Returning now to operation 1604, on determining the rating is not on a scale from negative one to positive one, the rating is normalized at 1606. The normalized rating is a rating within the scale from negative one to positive one. The reference response and rating for the reference response are added to the set of reference responses at 1608 with the process terminating thereafter.

Figure 17:
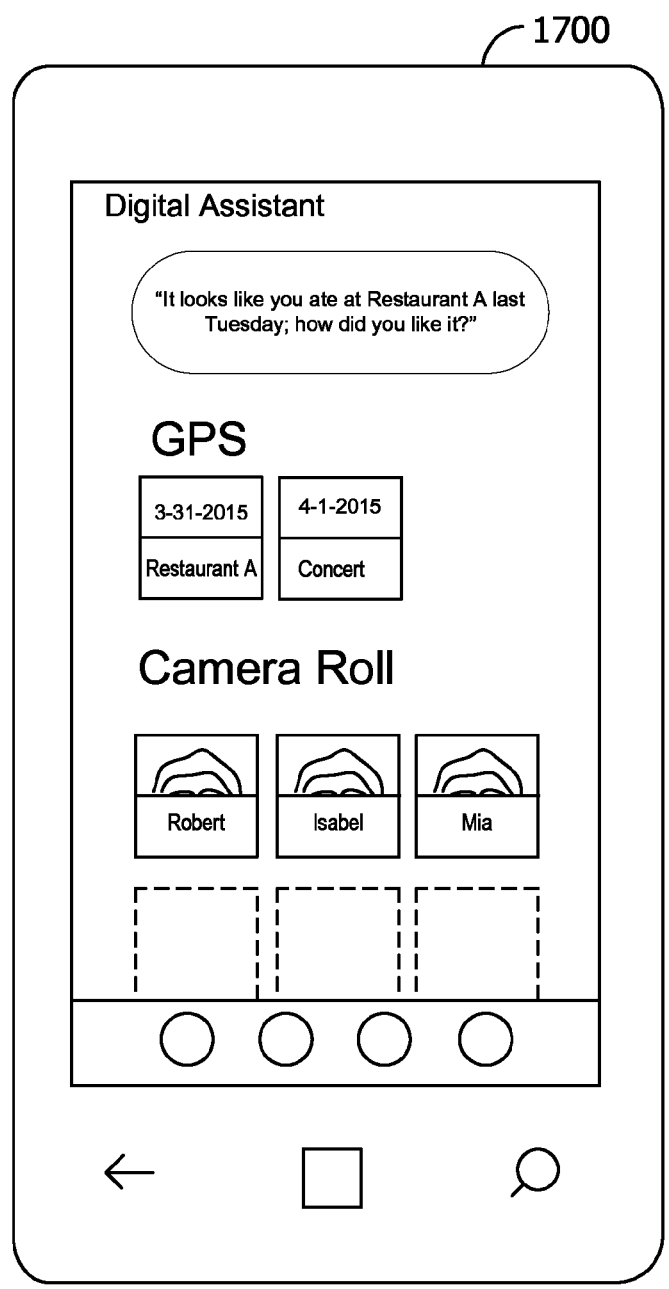
FIG. 17 is an exemplary block diagram illustrating a digital assistant.

FIG. 17 is an exemplary block diagram illustrating a digital assistant. Digital assistant 1700 is a device for managing personal information of a user. The digital assistant 1700 may include a set of sensors, such as one or more cameras, a GPS, audio sensors, a touch screen, a temperature sensor, a pressure sensor, an orientation sensor, as well as any other types of sensors. The digital assistant 1700 includes a response generation system that is capable of receiving user generated input messages and generating natural language output responses. The digital assistant 1700 may generate output responses in one or more formats, including text responses, audio responses, graphical responses, or any other types of responses.

Additional Examples

In some examples, the response assessment engine identifies an amount of overlap between the selected machine-generated conversational response and a selected references response. The response assessment engine increases a metric score of the selected machine-generated conversational response on determining a rating of the selected reference response is a positive rating. The positive rating indicates the selected reference response is a good reference response relative to a selected context-message data pair associated with the selected machine-generated conversational response. The response assessment engine may decrease the metric score of the selected machine-generated conversational response on determining the rating of the selected reference response is a negative rating.

In other examples, the response assessment engine generates a first metric score associated with a first machine-generated response. The response assessment engine updates the set of parameters in response to the first machine-generated response to form a modified set of parameters. The response assessment engine generates a second metric score associated with a second machine-generated response. The response assessment engine then updates the modified set of parameters based on the second metric score. The set of parameters are incrementally adjusted to increase metric scores.

At least a portion of the functionality of the various elements in FIG. 1 and FIG. 2 may be performed by other elements in FIG. 1 and FIG. 2, or an entity (e.g., processor, web service, server, application program, computing device, etc.) not shown in FIG. 1 and FIG. 2.

In some examples, the operations illustrated in FIG. 8, FIG. 10, FIG. 11, FIG. 13, FIG. 14, FIG. 15, and FIG. 16 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for generating a metric score for a machine generated response. For example, the elements illustrated in FIG. 1, FIG. 2, FIG. 8, FIG. 9, FIG. 10 and FIG. 11, such as when encoded to perform the operations illustrated in FIG. 8, FIG. 13, FIG. 14, FIG. 15, and FIG. 16, constitute exemplary means for generating a set of multi-reference responses, exemplary means for calculating an assessment metric, and exemplary means for generating a metric score.

Alternatively or in addition to the other examples described herein, examples include any combination of the following:

extracting candidate response triples from at least one source of conversational data to form a set of multi-reference responses further comprises extracting context-message-response triples from the at least one source of conversational data to form a plurality of candidate response triples, wherein a given candidate response triple comprises a human-generated message, a conversational context, and a reference response corresponding to the human-generated message, wherein the human-generated message and the conversational context form the context-message data pair the selected context-message data pair comprises a selected human-generated message and a conversational context of the selected human-generated message, and further comprising selecting a response from the plurality of candidate response n-tuples based on content of a message associated with the at least one response to form a reference response in the set of multi-reference responses, wherein a message associated with the reference response corresponds to the selected human-generated message the selected context-message data pair comprises a selected human-generated message and a conversational context of the selected message, and further comprising selecting a response from the plurality of candidate response triples based on conversational context of the response to form a reference response in the set of multi-reference responses, wherein the conversational context associated with the reference response corresponds to the conversational context of the selected machine-generated response a conversational context of a message comprises linguistic context data and non-linguistic context data, wherein the linguistic context data comprises message-response data pairs preceding the selected message and the selected machine-generated response in a conversation mining the context-message-response n-tuples from the at least one source of conversational data via a network connection, wherein the at least one source of conversational data is at least one of a social media source, wherein a social media source provides conversational data in at least one format, wherein a format of conversational data comprises a text format, an audio format, or a visual format the rating of a given reference in the set of multi-reference responses is a human-generated rating, and further comprising accessing the rating of the given reference in the set of multi-reference responses, wherein the rating for a given reference response in the set of multi-reference responses indicates a quality of the given response relative to a context-message data pair associated with the given reference response on determining the rating for a given reference response in the set of multi-reference responses is a rating on a scale other than a negative one to positive one scale, normalizing the rating to form a normalized rating within a range from negative one to positive one, wherein a negative value rating indicates the given reference response is sub-optimal relative to the selected context-message data pair the set of multi-reference responses is a test set of multi-reference responses, and further comprising training the response assessment engine based on a training set of multi-reference context-response-message n-tuples mined from the at least one source of conversational data, wherein training the response assessment engine further comprises calculating the assessment metric based on the training set of multi-reference context-message-response n-tuples to train a set of weights associated with the response assessment engine the metric score is a score within a scale from zero to one, and wherein generating the metric score further comprises calculating an amount of word sequence overlap between the selected machine-generated response and a reference response in the set of multi-reference responses, wherein an overlap of zero indicates no words in common between the selected machine-generated response and the at least one reference response, and wherein an overlap of one indicates the selected machine-generated response is identical to the reference response on determining an overlap between the selected machine-generated response and a references response, determining a raring of the reference response; increasing the metric score on determining the rating of the reference response is a positive rating indicating the reference response is a good reference response relative to the context-message data pair; and decreasing the metric score on determining the rating of the reference response is a negative rating.

the response assessment engine executes to identify an amount of overlap between the selected machine-generated response and a selected references response; increase a metric score of the selected machine-generated response on determining a rating of the selected reference response is a positive rating, the positive rating indicating the selected reference response is a good reference response relative to a selected context-message data pair associated with the selected machine-generated response; and decrease the metric score of the selected machine-generated response on determining the rating of the selected reference response is a negative rating the response assessment engine executes to generate a first metric score associated with a first machine-generated response; update the set of parameters in response to the first machine-generated response to form a modified set of parameters; generate a second metric score associated with a second machine-generated response; and update the modified set of parameters based on the second metric score, wherein the set of parameters are incrementally adjusted to increase metric scores the response assessment engine executes to calculate the assessment metric based on a training set of multi-reference context-message-response n-tuples the at least one source of conversational data is at least one of a social media source, wherein a social media source provides conversational data in at least one format, wherein a format of conversational data comprises a text format, an audio format, or a visual format wherein the conversational context associated with the reference response corresponds to the conversational context of the selected machine-generated response, wherein the conversational context comprises linguistic context data and non-linguistic context data, wherein the linguistic context data comprises message-response data pairs preceding the selected message and the selected machine-generated response in a conversation a given reference response in the set of reference responses includes a rating, and wherein the response assessment engine, when executed, further causes at least one processor to normalize the rating to form a normalized rating within a range from negative one to positive one, wherein a negative value rating indicates the given reference response is sub-optimal relative to the selected context-message data pair.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for automatic assessment of machine generated responses, said method comprising:
    extracting candidate context-message-response n-tuples, by an extraction component of a computing device, from at least one source of conversational data;
    forming a set of multi-reference responses selected from the candidate context-message-response n-tuples extracted by the extraction component;
    calculating an assessment metric for the machine generated response, by at least one processor, based on the set of multi-reference responses; and
    generating a metric score for the machine generated response based on the assessment metric, by the at least one processor, the metric score indicating a quality of the machine-generated response relative to the set of multi-reference responses.

2. The computer-implemented method of claim 1, wherein extracting candidate context-message-response n-tuples from at least one source of conversational data and forming a set of multi-reference responses further comprises:
    extracting candidate context-message-response n tuples from the at least one source of conversational data, wherein individual candidate context-message-response n-tuples comprise a human-generated message, a conversational context, and a reference response corresponding to the human-generated message.

3. The computer-implemented method of claim 2, further comprising:
    selecting a response from the extracted candidate context-message-response n tuples based on a context of a message associated with the response to form a reference response in the set of multi-reference responses, wherein a message associated with the reference response corresponds to the selected human-generated message.

4. The computer-implemented method of claim 2, further comprising:
    selecting a response from the extracted candidate context-message-response n-tuples based on conversational context of the response to form a reference response in the set of multi-reference responses, wherein the conversational context associated with the reference response corresponds to the conversational context of the machine-generated response.

5. The computer-implemented method of claim 4, wherein a conversational context of a message comprises linguistic context data and non-linguistic context data, wherein the linguistic context data comprises message-response data pairs preceding the selected message and the selected machine-generated response in a conversation.

6. The computer-implemented method of claim 2, further comprising:
    extracting the candidate context-message-response n-tuples from the at least one source of conversational data via a network connection, wherein the at least one source of conversational data is at least one of a social media source, wherein the social media source provides conversational data in at least one format, wherein a format of conversational data comprises a text format, an audio format, or a visual format.

7. The computer-implemented method of claim 1, wherein a rating of individual multi-reference responses in the set of multi-reference responses is a human-generated rating, and further comprising:

accessing the rating of the individual multi-reference responses in the set of multi-reference responses, wherein the rating indicates a quality of the individual multi-references responses relative to a reference multi-reference response.

8. The computer-implemented method of claim 1, further comprising:
determining a rating for individual multi-reference responses in the set of multi-reference responses is a rating on a scale other than a negative one to positive one scale, normalizing the rating to form a normalized rating within a range from negative one to positive one.

9. The computer-implemented method of claim 1, wherein the set of multi-reference responses is a test set of multi-reference responses, and further comprising:
training the response assessment engine based on a training set of multi-reference context-response-message n-tuples extracted from the at least one source of conversational data, wherein training the response assessment engine further comprises calculating the assessment metric based on the training set of multi-reference context-message-response n-tuples to train a set of weights associated with the response assessment engine.

10. The computer-implemented method of claim 1, wherein the metric score is a score within a scale from zero to one, and wherein generating the metric score further comprises:
calculating an amount of word sequence overlap between the machine-generated response and a reference response in the set of multi-reference responses, wherein an overlap of zero indicates no words in common between the machine-generated response and the reference response, and wherein an overlap of one indicates the machine-generated response is identical to the reference response.

11. The computer-implemented method of claim 10, further comprising:
on determining an overlap between the machine-generated response and the references response, determining a rating of the reference response;
increasing the metric score on determining the rating of the reference response is a positive rating; and
decreasing the metric score on determining the rating of the reference response is a negative rating.

12. A system for automatic assessment of machine generated responses, said system comprising:
at least one processor; and
a memory storage device associated with the at least one processor, the memory storage device comprising a memory area storing a response assessment engine, wherein the at least one processor executes the response assessment engine to:
calculate an assessment metric for at least one machine-generated response, based on a set of multi-reference responses, a set of ratings and contextual data being associated with the set of multi-reference responses;
generate at least one metric score indicating a quality of the at least one machine-generated response relative to at least one multi-reference response from the set of multi-reference responses; and
update a set of parameters associated with the response generation system based on the at least one metric score.

13. The system of claim 12, wherein the metric score is a score within a scale from zero to one, and wherein the at least one processor further executes the response assessment engine to:
calculate an amount of word sequence overlap between the machine-generated response and a reference response in the set of multi-reference responses, wherein an overlap of zero indicates no words in common between the machine-generated response and the reference response, and wherein an overlap of one indicates the machine-generated response is identical to the reference response.

14. The system of claim 12, wherein the at least one processor further executes the response assessment engine to:
identify an amount of overlap between the machine-generated response and a reference response;
increase a metric score of the machine-generated response on determining a rating of the reference response is a positive rating; and
decrease the metric score of the machine-generated response on determining the rating of the reference response is a negative rating.

15. The system of claim 12, wherein the at least one processor further executes the response assessment engine to:
generate a first metric score associated with a first machine-generated response;
update the set of parameters in response to the first machine-generated response to form a modified set of parameters;
generate a second metric score associated with a second machine-generated response; and
update the modified set of parameters based on the second metric score, wherein the set of parameters are incrementally adjusted to increase metric scores.

16. The system of claim 12, wherein the at least one processor further executes the response assessment engine to:
calculate the assessment metric based on a training set of multi-reference context-message-response n-tuples.

17. One or more computer storage media embodying computer-executable components, said components comprising:
an extraction component that when executed causes at least one processor to:
extract a plurality of candidate context-message-response n-tuples from at least one source of conversational data; and
select at least one candidate context-message-response n-tuple from the plurality of candidate context-message-response n-tuples associated with a machine-generated response to form a set of multi-reference responses; and
a response assessment engine that when executed causes at least one processor to:
generate a metric score for the machine-generated response based on the set of multi-reference responses, a conversational context of the machine-generated response, and an assessment metric, the metric score indicating a quality of the machine-generated response relative to the set of multi-reference responses.

18. The computer storage media of claim 17, wherein the at least one source of conversational data is at least one of a social media source, wherein the social media source provides conversational data in at least one format, wherein a format of conversational data comprises a text format, an audio format, or a visual format.

19. The computer storage media of claim 17, wherein the response assessment engine, when executed, further causes at least one processor to:
    select a response from the plurality of candidate context-message-response n-tuples based on the conversational context of the response to form a reference response in the set of multi-reference responses, wherein the conversational context associated with the reference response corresponds to the conversational context of the machine-generated response, wherein the conversational context comprises linguistic context data and non-linguistic context data, wherein the linguistic context data comprises message-response data pairs preceding the selected message and the machine-generated response in a conversation.

20. The computer storage media of claim 17, wherein individual multi-reference responses in the set of multi-reference responses includes a rating, and wherein the response assessment engine, when executed, further causes at least one processor to:
    normalize the rating to form a normalized rating within a range from negative one to positive one, wherein a negative value rating indicates that a multi-reference response in the set of multi-reference responses is sub-optimal.

* * * * *